Feb. 26, 1952 — M. D. FISKE — 2,587,305
BROAD BAND ELECTRICAL DISCHARGE DEVICE
Filed Nov. 23, 1949
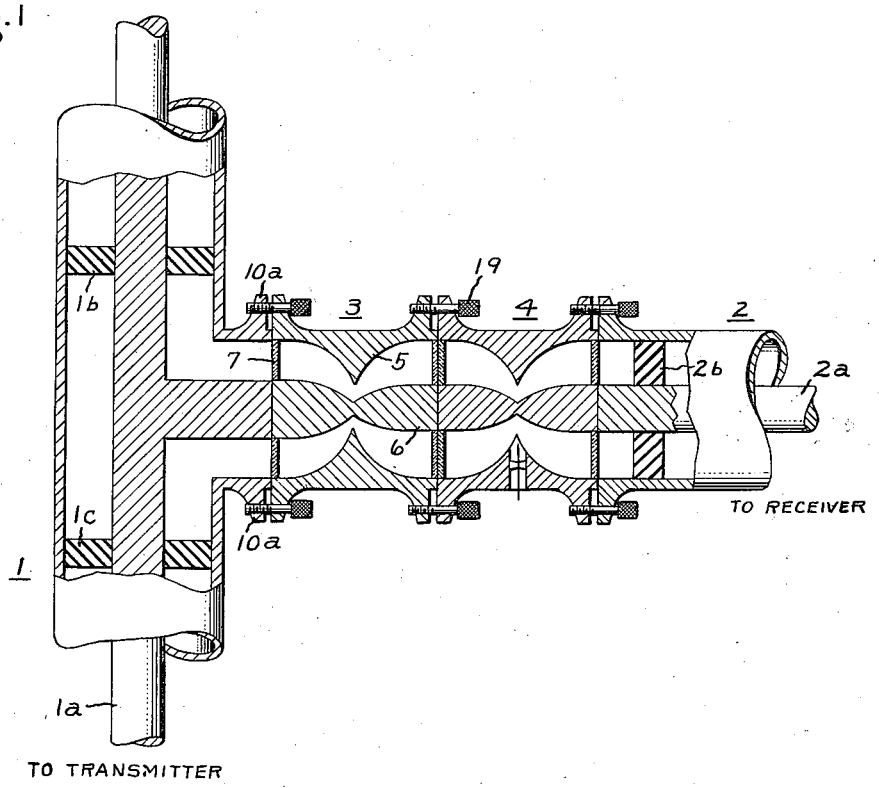
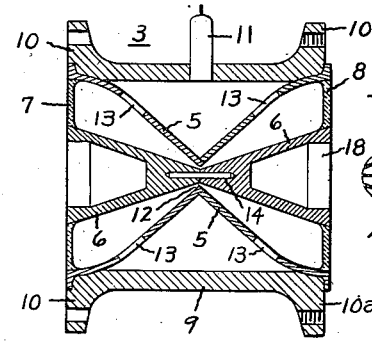
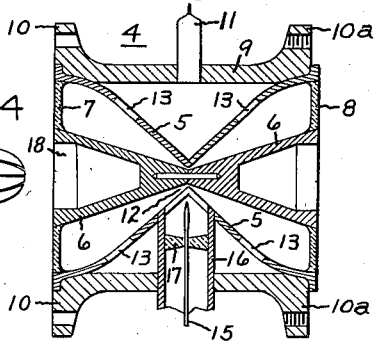
Inventor
Milan D. Fiske
by Paul A. Frank
His Attorney Patented Feb. 26, 1952

2,587,305

UNITED STATES PATENT OFFICE 2,587,305

BROAD BAND ELECTRICAL DISCHARGE
DEVICE

Milan D. Fiske, Ballston Lake, N. Y., assignor to
General Electric Company, a corporation of
New York Application November 23, 1949, Serial No. 129,141

6 Claims. (Cl. 315—5)

This invention relates, in general, to electrical discharge devices of the kind employing an ionizable gas and a discharge gap and, in particular, to an electronic switching device of the kind used with radar apparatus to protect the sensitive elements of a radar receiver from damage by signals of high power level from a radar transmitter.

The need for a switching device of the above character arises because of the use in radar systems of the same antenna for the purpose of transmitting radar signals and of receiving reflected or echo signals. Since both the transmitter and the receiver are connected to the same antenna, and since it is essential to the operation of a radar system that a signal of high power level be radiated by the antenna it is necessary to provide means for protecting the sensitive elements of the receiver from damage when signals of high power level are being transmitted to the antenna. Conventionally, the means used to protect the receiver comprises an electrical discharge device commonly referred to as a TR (transmitter-receiver) switch. One form of TR switch comprises electrodes forming a discharge gap and an ionizable gas in the vicinity of the gap to facilitate the formation of an electrical discharge across the gap. When a transmitted signal of high power level attempts to pass through the transmission line connecting the antenna to the receiver, an electrical discharge is produced across the gap and thus, in effect, the transmission line from the radar receiver to the antenna is short circuited during the transmitting interval. In this way, the radar receiver is protected while the transmitter is in operation.

In general, TR switches comprise, in addition to a discharge gap which is much smaller than the dimensions of the transmission line to which it is connected, a tuned cavity resonator or circuit to neutralize the discontinuity introduced in the transmission line by the gap as well as to facilitate the electrical breakdown of the gap. It is readily appreciated that when tuned elements are used, the TR switch becomes sensitive to variations in frequency at which the radar operates. That is, if the frequency of operation shifts, it is necessary to retune the TR switch to obtain satisfactory as well as optimum performance. In certain applications of radar apparatus, frequency sensitive components are especially undesirable. For instance, if the frequency of operation of the radar apparatus is appreciably changed to avoid jamming, i. e., incapacitating of the radar by external signals, it would be necessary to retune the frequency sensitive TR switch for satisfactory operation of the radar at the new frequency. In the retuning operation, valuable time would be lost.

To be able to switch from one frequency of operation to another frequency of operation appreciably separated in the electromagnetic spectrum from the first frequency without difficulty and without loss of valuable time, it is desirable to use components in the radar that are non-frequency sensitive and consequently do not require retuning when the radar is operated on a new frequency.

It is a general object of the present invention to provide improvements in electrical discharge devices of the character described above and, in particular, it is an object to provide an electronic switching device which is relatively insensitive to wide variations of frequency. It is a further object to provide a broad band switching device which is simple to construct and which requires a minimum of tuning adjustments to ready the device for operation over a broad band of frequencies.

The foregoing objects are, in general, achieved by the utilization of the inner and the outer conductor of a section of concentric transmission line as the gap-forming discharge electrodes of the electronic discharge device. The gap within the device is formed by tapering the transmission line from both ends so that a discharge gap is formed intermediate the ends thereof. The section of transmission line is so tapered that the characteristic impedance of the transmission line is substantially constant along its length. With the foregoing construction, a discharge gap is formed with substantially no discontinuity in the transmission characteristics of the transmission line, of which the gap is a part. When a low intensity signal passes along the transmission line and through the device to the receiver, it experiences no discontinuity and, because of its small magnitude, does not cause an electrical breakdown across the discharge gap. However, when a high power signal from the transmitter passes along the transmission line toward the receiver, there is an electrical breakdown discharge across the gap because of the reduced distance between the inner and outer conductors at the gap. Thus the transmission line going to the receiver is sealed off from the high power signals from the transmitter. Because the section of tapered transmission line behaves identically over a wide band of frequencies there is no need to adjust the TR switch as the frequency of operation of the radar system is changed. The device becomes frequently sensitive only when the wave length on which the radar system is to be operated approaches in magnitude the circumferential distance of the outer conductor at the gap.

The features of the invention which I consider novel are pointed out with particularity in the appended claims. The invention itself, together with its further objects and advantages may best be understood by reference to the following description taken in connection with the accompanying drawing in which Fig. 1 is a semi-schematic representation useful in explaining the utility of an embodiment of the invention; Figs. 2 and 3 are cross-sectional views of devices embodying the invention; and Fig. 4 shows a "bullet-shaped" connector by means of which the inner conductors of the devices of Figs. 2 and 3 may be connected together.

Referring now particularly to Fig. 1 there is shown in section a semi-schematic representation of the manner in which the transmitter, the antenna and the receiver of a radar system are connected together. High frequency energy generated by the transmitter is conducted through a transmission line 1 to an antenna. The returning signals intercepted by the antenna are transmitted back through the transmission line 1, and then conducted through a second transmission line 2, connected to transmission line 1, to a radar receiver where they are utilized. In order that the receiver may not be damaged by the transmitter signal, which is inherently always of a much higher power level than the echo or received signal, it is necessary that means be provided for intercepting the communication between the transmission line 1 and the radar receiver during the transmitting interval. This is accomplished by interposing in the transmission line an electronic switching device or devices such as TR devices 3 and 4. The devices 3 and 4 consist of a sealed enclosure having dielectric windows through which wave energy may pass and contain an ionizable gas adapted to support a discharge. Electrodes 5 and 6 are provided within the switch in the form of a section of tapered concentric transmission line to facilitate commencement of an electrical discharge. With this arrangement establishment in the vicinity of the window 7 of relatively intense electric fields which accompany the transmitting signal or pulse immediately produces an ionizing discharge within the TR device 3. As a consequence, the entrance to the wave transmission line 2 is effectively short circuited and passage of energy to the receiver is blocked. When the transmitter stops sending signals to the antenna in its normal cycle of operation, the electrical discharge at the TR switch disappears. Consequently, the transmission line from the antenna to the receiver is open for the transmission to the receiver of echo signals picked up by the antenna. The power level of the echo signal is low so that the echo signal does not cause a discharge across the gap but passes unimpeded through the gap to the receiver.

The foregoing describes the way in which my improved TR switch functions in a radar system to protect the sensitive elements of the radar receiver from the high intensity pulses from the radar transmitter. Even while the radar system is of itself functioning satisfactorily, it may be rendered ineffective for all practical purposes by spurious signals coming from other apparatus in the vicinity. When the receiver is jammed or blocked in this way by spurious signals picked up by the radar antenna from other apparatus, it is desirable to quickly change to another frequency, preferably appreciably separate in the spectrum from the first frequency. By employing an electronic switching device in the radar apparatus which is non-frequency sensitive, the tuning and adjustment of the switching device is simplified considerably and thereby it becomes considerably quicker and easier to tune the radar apparatus to the new frequency.

Referring now to Fig. 2 and to the particularities of construction of one embodiment of my invention, there is shown an electronic switch such as utilized in the system of Fig. 1. This device comprises electrodes 5 and 6 forming a section of concentric transmission line having substantially constant characteristic impedance. At the center of the section of concentric transmission line, a gap 12 is formed by tapering both the outer conductor 5 and the inner conductor 6 of the section of transmission line. The inner and outer conductors are tapered to form the gap in a manner such that the ratio of radius of inside surface of the outer conductor 5 to the radius of the inner conductor 6 is substantially constant. It is necessary to taper the conductors in this way in order to maintain the characteristic impedance of the section of transmission line formed in device 3 uniform. The justification for the preceding statement is readily apparent by considering that the characteristic impedance of a concentric transmission line with low losses is given by the relationship:

$$Z_0 = \sqrt{\frac{L}{C}} \qquad (1)$$

where $Z_0$=the characteristic or surge impedance of the transmission line, where L=the inductance per unit length of transmission line, and where C=capacitance per unit length of transmission line. Since for a concentric transmission line, $$L = 0.4605 \log_{10} \frac{b}{a} \times 10^{-6} \text{ henry per meter} \qquad (2)$$

and $$C = \frac{0.241}{\log_{10} \frac{b}{a}} \times 10^{-10} \text{ farad per meter} \qquad (3)$$

where $a$=radius of inner conductor and $b$=inner radius of outer conductor, it is readily apparent by substitution of Equations 2 and 3 in Equation 1 that $$Z_0 = 138 \log_{10} \frac{b}{a} \text{ ohms}$$

Thus it is seen that if the ratio of the inner radius of the outer conductor to the radius of the inner conductor is kept constant the characteristic impedance is kept constant.

Continuing now with the description, the inner and outer conductors of the transmission line are supported in place by means of the annular-shaped dielectric windows 7 and 8. The members 5 and 6 are preferably made of material suitable for sealing to glass such as alloys of iron, nickel and cobalt well known in the art. To facilitate fabrication of the two sections of member 6 aligning pin 14 is used. The electrodes 5 and 6 are housed in a cylindrical member 9 having flanged portions 10 and 10a to facilitate connection of the device to transmission lines.

The cylindrical member 9 is shown with a tubulation 11 through which air may be exhausted from the device and an ionizable gas such as argon introduced for the purpose of facilitating the formation of an electrical discharge across the gap 12. The holes 13 in the outer conductor 5 of the section of transmission line are used to permit the evacuation of the space between the conductors 5 and 6 of the concentric transmission line as well as permit fabrication of the device.

Referring now to Fig. 3, there is shown the discharge device of Fig. 2 with the addition of an auxiliary electrode 15 commonly called a "keep-alive" electrode. The function of the keep-alive electrode is to maintain a low concentration of ions in the vicinity of the discharge gap 12 in order to further facilitate the formation of an electrical discharge across the gap. The keep-alive electrode 15 is located in the vicinity of the gap by means of the construction shown comprising a cylindrical conductor 16 welded or soldered to the outer conductor 5, and the housing structure 9 as shown. In order to insulate the keep alive electrode 15 and permit the energizing of this electrode with respect to the outer conductor 5, the keep-alive electrode 15 is sealed by means of glass seal 17 to conductor 16. The seal 17 also hermetically seals the space between the conductors 5 and 6.

For some radars a device of the character shown in Fig. 2 would supply sufficient protection. Where higher transmitting powers are used, it is desirable to use a device more sensitive to the transmitted signal. Such a device is shown in Fig. 3. In order to achieve greater voltage sensitivity and reduce the power leakage through the devices, the devices of Figs. 2 and 3 may be connected together as shown schematically in Fig. 1. The devices may be connected mechanically together in a variety of ways and in Fig. 1 devices 3 and 4 are shown connected together by means of a threaded screw 19 which engages the devices 3 and 4 through the flanges 10 and 10a. Inner conductor 1a of concentric transmission line 1 is held in place by insulators 1b and 1c. Inner conductor 2a of transmission line 2 is held in place by dielectric insulator 2b. Inner conductors 6 of devices 3 and 4 are connected with a "bullet-shaped" connector member 20 with flexible fingers at each end, entirely contained in holes 18 and making good contact with the conductors 6. The connection of inner conductors 6 to inner conductors 1a and 2a may be made by similar "bullet-shaped" members. Flange member 10a of transmission line 2 and of devices 3 and 4 is threaded so as to engage with the screw portion of member 19.

In Fig. 1 the first gap is located approximately a quarter of a wave length at the operating frequency of the radar from the junction of the transmission lines 1 and 2. The second gap is located approximately a quarter of a wave length from the first gap. When a transmitted pulse passes down the transmission line 1, a portion of the energy passes down transmission line 2 and causes the first gap to break down. Because of the inherently high power level of the transmitting pulse, some of the energy therefrom leaks through the first gap and causes the second gap to fire. By the utilization of two gaps in this way, the electromagnetic energy that leaks through to the receiver is kept at a minimum.

When high transmitter power levels are used, an electrical discharge will be caused to exist across the inside face of the window 7. For this reason, on high powered radars it is desirable to so construct the device 3 that the distance from the junction of transmission lines 1 and 2 to the window 7 is a quarter of a wave length at the operating frequency and the distance from window 7 to the first gap 12 is a quarter of a wave length and the distance from the first gap to the second gap is a quarter of a wave length. The details on multiple element protection in radar systems are contained in my copending patent application, Serial No. 538,483, filed June 2, 1944, and assigned to the assignee of the present application now Patent No. 2,567,701.

While the invention has been described by reference to particular embodiments, it is obvious that further arrangements and applications will occur to those skilled in the art, and I therefore aim in the appended claims to cover all such equivalent variations as come within the true spirit and scope of the foregoing invention.

What I claim as new and desire to secure by Letters Patent of the United States is:

1. A substantially non-resonant electrode structure for an electrical breakdown device comprising a section of concentric transmission line, said transmission line being tapered to form a discharge gap between the inner and outer conductors of said transmission line intermediate the ends thereof, the ratio of the radius of the inner conductor to the outer conductor being substantially constant.

2. An electrical discharge device comprising a section of concentric transmission line, said transmission line having concentric conductors tapered to form a gap intermediate the ends thereof, the ratio of the radius of the outer conductor to the inner conductor of said transmission line being substantially constant to maintain the characteristic impedance of said section of transmission line substantially uniform, means hermetically enclosing the region between said inner and outer conductors, and an ionizable gas contained within said enclosing means.

3. An electronic switching device comprising a hollow conductor, a second conductor extending within said hollow conductor and forming therewith a propagating system for high frequency power, an ionizable gas occupying the space between the conductors, said conductors being of relatively great spacing at a certain region thereof and of relatively small spacing at a second region thereof at which a discharge between them is desired to occur, the transition between said regions being accomplished by a progressive diminution of the internal dimension of said hollow conductor and the external dimension of said inner conductor to form a propagating system having a substantially constant characteristic impedance from point to point along its length.

4. A broad band electronic switching device comprising an enclosure, an ionizable gas contained within said enclosure, said enclosure including a hollow conductive member inwardly tapered intermediate the ends thereof to form a gap, dielectric windows fastened to the open ends of said hollow conductive member, a second conductive member symmetrically located and supported within said hollow conductive member and in registry therewith to form a concentric transmission line of substantially uniform characteristic impedance.

5. A substantially non-resonant electromagnetic wave switching device of the character utilizing an electrical breakdown gap comprising an enclosure, an ionizable gas contained within said enclosure, said enclosure including a hollow conductive member tapered inwardly intermediate the ends thereof forming the outer conductor of a tapered concentric transmission line, and a second tapered conductive member located within said hollow conductive member toから therewith a tapered concentric transmission line of constant characteristic impedance having a discharge gap intermediate the ends thereof.

6. A substantially non-resonant electromagnetic wave switching device of the character utilizing an electrical breakdown gap comprising an enclosure, an ionizable gas contained within said enclosure, said enclosure including a hollow conductive member tapered inwardly intermediate the ends thereof forming the outer conductor of a tapered concentric transmission line, and a second tapered conductive member located within said hollow conductive member to form therewith a tapered concentric transmission line of constant characteristic impedance having a discharge gap intermediate the ends thereof, an auxiliary electrode extending through said first hollow conductive member into the vicinity of said discharge gap to facilitate an electrical discharge across said gap, said electrode being insulated from said first hollow conductive member and hermetically sealed thereto.

MILAN D. FISKE.

REFERENCES CITED

The following references are of record in the file of this patent:

UNITED STATES PATENTS

| Number | Name | Date |
| --- | --- | --- |
| 2,404,116 | Wolowicz | July 16, 1946 |
| 2,496,865 | Fiske | Feb. 7, 1950 |